United States Patent [19]
Holmes

[11] Patent Number: 5,469,250
[45] Date of Patent: Nov. 21, 1995

[54] PASSIVE OPTICAL WIND PROFILOMETER

[75] Inventor: Richard B. Holmes, Woodland Hills, Calif.

[73] Assignee: Rockwell International Corporation, Seal Beach, Calif.

[21] Appl. No.: 62,081

[22] Filed: May 17, 1993

[51] Int. Cl.[6] ............................... G01P 3/36; G01C 3/08
[52] U.S. Cl. .......................... 356/28; 356/4.01; 356/358; 356/362
[58] Field of Search ................... 356/4, 5, 1, 28, 356/342, 358, 362

[56] References Cited

U.S. PATENT DOCUMENTS

| | | | |
|---|---|---|---|
| 3,558,898 | 1/1971 | Block et al. | 356/28 |
| 5,153,665 | 10/1992 | Weinstein | 356/28 |
| 5,159,407 | 10/1992 | Churnside et al. | 356/354 |

OTHER PUBLICATIONS

Remote probing of a distant turbulent layer using various spacial filtering method, Valery v. Zavorotny, Applied Optics, vol. 31, No. 36, Dec. 20, 1992.

*Primary Examiner*—Stephen C. Buczinski
*Attorney, Agent, or Firm*—H. Fredrick Hamann; Harry B. Field; Steven E. Kahm

[57] ABSTRACT

The passive wind profilometer measures wind transverse to a line of sight as a function of range. Schlieren which are natural occurrences in wind act as refracting lenses which move along with the wind. The patches of refracted light are detected by use of a light-intensity-sensitive television camera and a microprocessor. The range of the schlieren are determined from the scale size of the refracted patches of light. The microprocessor, using a specific algorithm for processing the light intensity data, then statistically compares the positions of the schlieren at different times to determine the wind velocity.

9 Claims, 2 Drawing Sheets

(time t)

(time t+Δt)

PASSIVE OPTICAL WIND PROFILOMETER

BACKGROUND OF THE INVENTION

1. Field of the Invention

This invention relates to the measurement of fluid flows, particularly in the measurement of wind velocities, wind shears and wind turbulence perpendicular to a line-of-sight.

2. Description of Related Art

This invention relates generally to the art of optical flow diagnostics and more particularly to the art of measurement of a wind profile along an optical path.

As early as 1897, it was reported that the range and direction, and speed of atmospheric currents could be inferred from stellar scintillation in the focal plane of a telescope though no specific method was proposed or demonstrated. It is well-known that scintillation arises from turbulence in the atmosphere.

Refinements of the principle are well-known. These include measurement of the spatio-temporal and spatio-angular correlation function of the scintillation. Simple spatio-temporal correlation is well known to provide overall wind speed and direction, but does not provide resolution of the wind profile along the optical path. Previous attempts to improve resolution have resulted in numerically intractable formulae with poor noise properties. [See D. L. Fried, "Remote Probing of the Optical Strength of Atmospheric Turbulence and Wind Velocity", Proceedings of the IEEE, Vol. 57 No 4, pp. 415–420 (1969)]. The spatio-angular correlation function can be used to measure the range of turbulence, but provides no information on the wind speed. Furthermore, these techniques require that significant averaging be used, and that two sources be used for spario-angular correlation.

Also well known are additional refinements to the basic principle. In one example the average log-amplitude variance was measured at one or more spatial frequencies and weighted combinations of these measurements were used to improve range resolution of turbulence measurement. In such discussions, no reference is made of the possibility of utilizing the same approach for the measurement of wind speed or direction. Additionally, such measurements used sinusoidal spatial filters in the pupil plane which were introduced mechanically and in sequence.

In another well-known refinement, an active source is-used that moves with substantial and known velocity across the field-of-view of the optical receiver. This technique also uses spatial filters in the pupil plane, or the synthesis of signals from many apertures.

In yet another well-known refinement, radar is used in conjunction with the measurement of scintillation. In this technique the wind is measured directly with radar in order to determine the profile of the strength of turbulence along the optical path.

In a fourth well-known refinement, two spatial filters are used in or near the pupil plane, and the light is focused onto a single-element detector which records the filtered, time varying signal. The spatial periods and locations of the two filters are claimed to determine the range of the turbulence from which the scintillation arises, and the spatial frequency of the scintillating turbulence. Given the spatial frequency of the turbulence and the temporal frequency of the recorded signal, the speed of the turbulent layer may be deduced. Evidently, practical implementation of this technique for profiling of wind requires sequential measurements with a variety of spatial filters and filter separations; furthermore the signal is heavily-filtered, resulting in reduced signal and accuracy.

A fifth well-known technique utilizes simple spatial filtering and some defocus from the focal plane. The analysis was not extended to the treatment of extended turbulence, and was not applied to the estimation of the wind profile along the optical path. It was concluded that the approach works only if two spatial filters are provided or if one spatial filter is provided and a sinusoidal source is also available.

Various means available for detecting air turbulence require one or more active laser sources. These techniques are often interferometric in nature and require substantial laser power and coherence.

It is well-known that techniques utilizing Doppler backscatter from radar or lasers can be used to measure wind parallel to the line-of-sight. Acoustic means are also well-known to be able to measure winds along the direction of propagation of the optical wave, and require both a means for transmission and reception of acoustic signals.

It is also well-known that radar can be used to measure winds transverse to the line of sight, though the signal-to-noise ratio of such techniques is poor under clear-air conditions, and the radar array is bulky.

It is also well known that a diversity of mechanical means may be used to measure local winds, but no such approach is capable of sensing winds remote from the device.

SUMMARY OF THE INVENTION

The present invention detects light intensity variations from a distant luminous region at intervals of time caused by turbulent refractive index variations present along the line-of-sight of an optical receiver. The light is filtered spectrally but not filtered spatially. A method of signal processing is used to deduce the speed and direction of winds as a function of range along the line-of-sight.

OBJECTS OF THE INVENTION

It is an object of the invention to provide an improved method of measuring wind directed transverse to a path as a function of range.

It is also an object of this invention to provide a compact and versatile optical method of measuring winds as a function of position along a line-of-sight.

It is another object of this invention to measure wind transverse to the line-of-sight without spatial filtering, so as to utilize an undiminished signal.

It is a further object of this invention to measure winds without need for active probing with lasers, radar, or acoustic means.

It is yet another object of this invention to measure winds without need for moving parts.

It is yet another object of this invention to provide rapid measurements of winds transverse to the line-of-sight, with reduced need for multiple samples and averaging.

Other objects, advantages and novel features of the present invention will become apparent from the following detailed description of the invention when considered in conjunction with the accompanying drawing.

DETAILED DESCRIPTION OF THE PREFERRED EMBODIMENT

Atmospheric scintillations are the intensity variations in apparent position, brightness or color of light observed as one looks through the atmosphere. Scintillations are caused by atmospheric turbulence and may be observed in both the image plane and the pupil plane of an imaging system. Most observable scintillation phenomena in the atmosphere result from density fluctuations developed by turbulent processes. These schlieren are refractive anomalies produced in transmitted light by differences in density or other anisotropy in parcels or strata of air.

It has been established that almost all scintillation effects are caused by anomalous refraction occurring in rather small parcels or strata of air (schlieren) whose temperatures and densities differ slightly from those of their surroundings. Normal wind motions transport such schlieren across a line-of-sight producing irregular fluctuations characteristic of scintillation. Parcels of air only centimeters to decimeters are believed to produce most of the scintillory irregularities in the atmosphere. These small parcels are responsible for the blurry wavy images observed by one looking down a highway at a distant object on a hot day.

The invention takes advantage of these small parcels of refractive anomalies (schlieren) which are transported by the wind to measure the winds' velocity. The refractive anomalies act as small lenses transported by the wind. The scale-size of the observed intensity variations of light from the object are related to the distance of the refractive anomalies from the detection equipment. Therefore the wind speed at various ranges along a line of sight can be determined by use of the invention.

For the system to function a luminous region or a source of contrast modulation must be available in the general direction of interest. Such a light source is usually available under clear air conditions: the horizon, a cloud edge, a small object, a glint, or an object edge will suffice; the effective signal is scaled by the fractional intensity modulation of the source. On the other hand, a contrast variation may be unavailable in foggy or hazy conditions, or in cases in which the direction of interest consists of uniform radiance, such as clear blue sky. In these cases, active illumination and backscatter using a short-pulse laser may provide adequate signal. In cases of severely-limited visibility, no remote-sensing system will maintain high performance.

Figure 1:
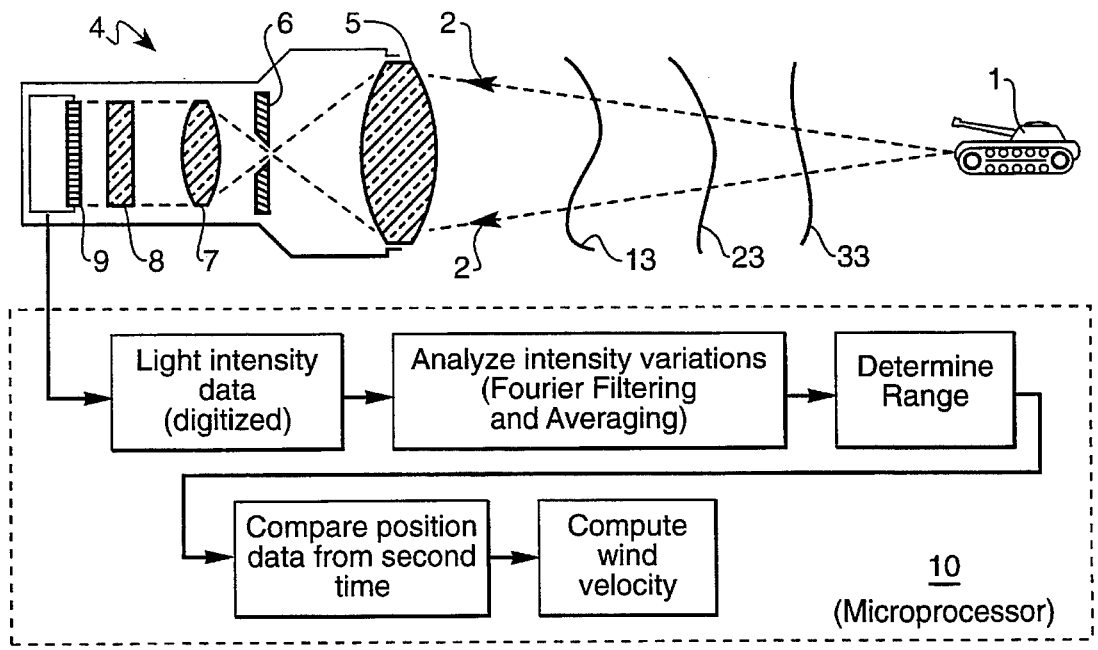
FIG. 1 is a schematic of the invention.

FIG. 1 is a schematic of the invention. The input to the system requires a luminous region such as source of light 1. In the figure, light represented by arrows 2, is reflected from an object and travels through the atmosphere containing convecting turbulence or schlieren 13, 23 and 33, to the detection equipment 4.

The detection equipment 4, comprises a FOV filter having a coarse pinhole to reduce the field of view, a special filter and a camera. The FOV filter has a first lens 5, a pinhole 6, located approximately in the focal plane of the first lens, and a second lens 7. The lenses form a relay for imaging the pupil plane at lens 5, onto a camera 9.

The light from the lens then passes through a spectral filter 8 and the resultant light at a known wavelength enters camera 9 which is a charge-coupled device having an array of at least 20 by 20 pixels. The camera used in the experiments was a CIDTEC model 1520, however an EG&G. RA6464N or other cameras could be used.

The camera pixels measure the spatial intensity of the light and sends the information to a microprocessor 10. A short interval of time later a second ,image is collected by the camera and the digitized information is again sent to the microprocessor for comparison with the first set of data.

Figure 2:
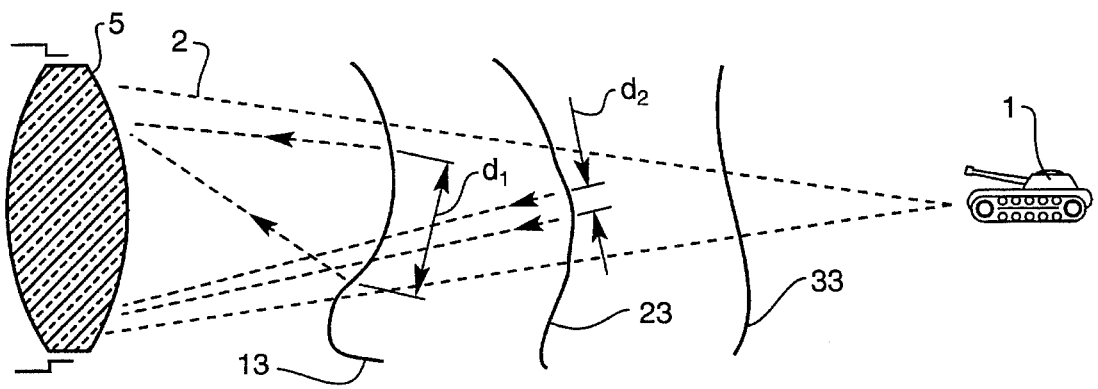
FIG. 2 is a schematic of variations in atmospheric scintillation measured by the invention.

FIG. 2 shows the light from object 1 being refracted by schlieren 13 having diameter $d_1$ and schlieren 23 having diameter $d_2$.

The intensities of the scintillations, the distances from the camera and the diameter of the scintillations are related and the microprocessor can extract the distance and intensity information from the detector to give accurate positions of the schlieren. A second frame taken shortly after the first frame allows location of the schlieren a known amount of time after the first frame. Since the schlieren have been transported to their new positions by the wind, the microprocessor can determine the wind speed perpendicular to the line-of-sight by comparing the positions of the schlieren at the two different times. The entire process may be repeated for an improved signal-to-noise ratio, resulting in an improved estimate of the wind profile.

Figure 3A:
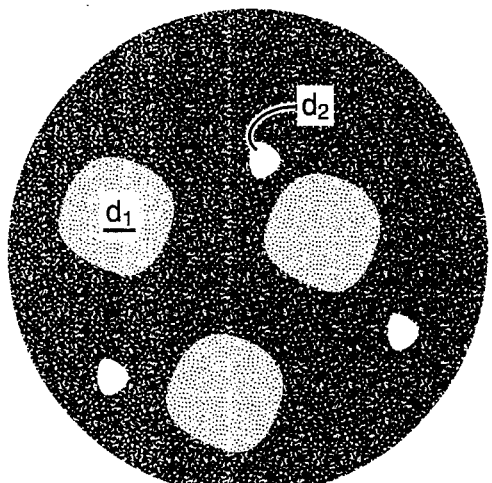
FIG. 3 is a schematic showing that the movement of multiple scintillations is determined by the local velocity of the wind.
Figure 3B:
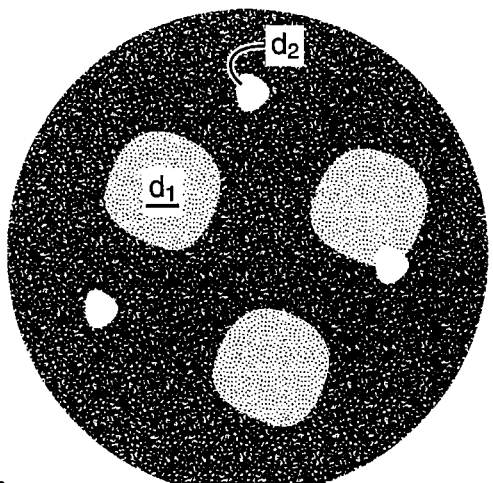
Figure 3C:
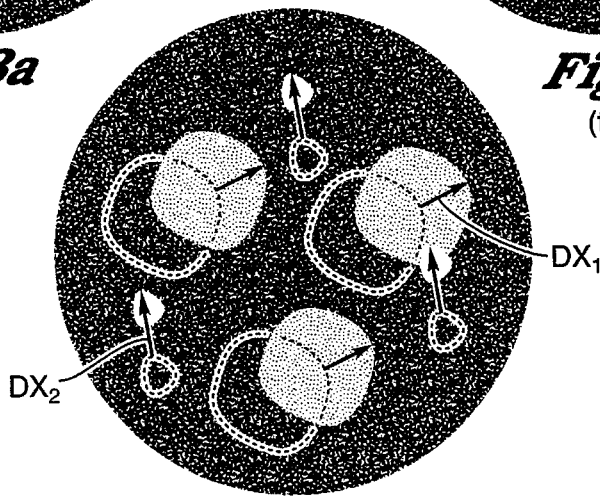

FIG. 3 schematically displays the schlieren diameter and intensity recorded in the pupil plane of the camera. FIG. 3a shows schlieren 13 as having a relatively large diameter $d_1$ and a relatively low intensity and schlieren 23 as having a relatively small diameter $d_2$ and a relatively high intensity at time t. FIG. 3b shows the same schlieren at time t+Δt. FIG. 3c shows a view of the schlieren 13 and 23 at times t and t+Δt overlapping, thereby showing how the schlieren have moved during time Δt.

The microprocessor is programmed to detect the change in position with regard to the change in time to determine the velocity of the wind transverse to the line of sight to the object.

Figure 4:
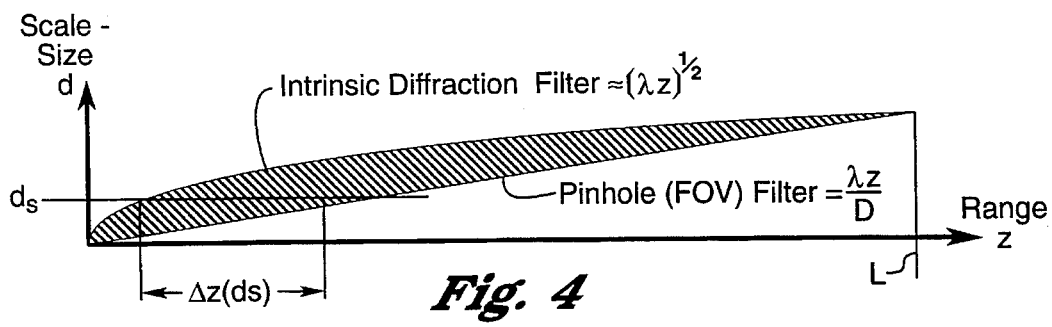
FIG. 4 is a schematic showing that scintillation size depends on range.

FIG. 4 shows that the scintillation scale of the turbulence, and that the spatial scale $d_s$ determines a range resolution element $\Delta z(d_s)$ effective in creating scintillation $d \approx (\lambda z^1)^{1/2}$, where λ is the optical wavelength, $z^1=z/(1-z/L)$ and z is the distance from the turbulent layer to the receiver at range L. This dependence arises because the random turbulent lenses in the atmosphere focus and or defocus the light passing through it according to the formula $$I(L)=P_o/[d^2+(\lambda z^1/d^2)] \qquad (1)$$

where I is the on-axis optical intensity in Watts per square meter, and Po is the optical power incident on a lens of size d at range z from a source at range L. It may be seen that the intensity is optimized when $d=(\lambda z^1)^{1/2}$. Thus the scale-size of an intensity perturbation determines its range, and its inter-frame motion determines the relative transverse velocity of the turbulence at that range.

The basic method is obviously generic: for example, a broad spectrum of wavelengths can be used. Thus sources in the visible can be used during daytime operation, and IR sources can be used at night. Also, the approach can use temporally and spatially incoherent light. Thus passive operation is possible and preferred, although active illumination can be used to increase the strength of the incident signal.

The basic teaching described above is of adequate accuracy for some applications; however for greater accuracy, specific microprocessor algorithms described below must be used in conjunction with the hardware described above.

System Design Considerations

The system must accurately measure scintillation in two or more successive camera frames. The measured scintillation must then be extracted from the data; its size must be measured to determine the corresponding range of the focussing turbulent layer, and then its motion must be tracked to extract velocity information. The measurement process primarily involves hardware. The subsequent reduction of the data requires algorithms of sufficient generality, flexibility, and accuracy to provide the maximum possible information from any given data set.

Hardware Design

The basic concept requires measurement of scintillation in two frames occurring in rapid succession. Design considerations include the SNR corresponding to the signal, and the rapidity with which the data be taken.

The SNR of the signal depends on a number of characteristics of the system. The basic photometric characteristics are common to all imaging systems, and are familiar to those skilled in the art. The most cogent characteristics for this application are the size of the light gathering system, the camera frame duration, spectral and field-of-view filtering, and camera pixel size. These parameters are most important since they not only affect SNR, but also affect the quality of the measurements. The tradeoffs are summarized in the following table:

TABLE 1

System Parameters and Constraints

| Parameter | Lower Bound | Upper Bound |
| --- | --- | --- |
| 1. aperture size d | a. must be bigger than random lenses of turbulence ($\gg d_{in}$) b. must be big enough to collect adequate light for the application ($\geq 1$ cm) c. must be big enough to sample scale sizes corresponding to ranges L of interest ($d \geq (\lambda L)^{1/2}$) | a. must be small enough for application(5–30 cm) |
| 2. camera frame duration | a. must be long enough to collect adequate light for the application | a. must be short enough to avoid smearing of scintillations ($<d_s/v_{wind}$) |
| (Until recently, camera frame duration/rate were key limitations in the implementation of this technology) | | |
| 3. camera frame rate | a. must be long enough so that scintiles move perceptibly ($>d_s/v_{wind}$) | a. must be short enough to keep scintiles of of previous frame within pupil ($<d/v_{wind}$) |
| 4. camera size (cm) | a. must be big enough to avoid excessive diffraction in the beam train ($z_d < 25$ meters in output space) | a. must be small enough to concentrate light onto pixels for best signal (~1 cm; application dependent) |
| 5. camera size (pixels) | a. must be numerous enough capture dynamic range of scintillation ($>d/(5d_{in})$) | a. must be few enough to avoid excessive detector noise. |
| 6. pinhole | a. must be large enough to pass scintillations ($d_{sp} \geq \lambda L_d/d_{in}$) | a. must be small enough to eliminate all but one small feature of scene |
| 7. optical | a. should be long enough | b. should be short |

TABLE 1-continued

System Parameters and Constraints

| Parameter | Lower Bound | Upper Bound |
| --- | --- | --- |
| wavelength | to avoid strong-scattering scintillation ($\lambda > 0.35$ microns; application-dependent) | enough so that scintillation is appreciable ($\lambda < 3$ microns; application dependent) |
| 8. spectral filter | a. must have sufficient bandwidth to allow adequate light (application-dependent) | a. must be small enough to avoid scintillation washout ($\Delta\lambda/\lambda > 0.1$) |

Legend:
$d_{in}$ = inner scale of turbulence; $\approx 0.1$ cm
$d$ = aperture size
$d_s$ = scale-size of scintillations
$v_{wind}$ = wind speed
$z_d$ = propagation length of beam train, weighted by magnification
$d_{sp}$ = width of spatial filter at focus of pupil lens
$L_d$ = focal length of pupil lens
$\lambda$ = mean optical wavelength of receiver system
$\Delta\lambda$ = spectral bandpass of spectral filter The above parameters directly influence the performance of the invention. From these a complementary table may be developed, in which nominal performance requirements are related through equations to parameters of the invention given in Table 2.

TABLE 2

Invention Performance for a Specific Application

| Performance parameter | Equation |
| --- | --- |
| Radiometric SNR (>10) | standard photometry |
| No. of range resolution cells (>10) | $d/(5d_{in})$ |
| Maximum wind allowed (>20 m/sec) | $\min(d_s/t_d, d/t_r)$* |
| Wind accuracy ($\Delta v/v < 10\%$) | 1/SNR |
| Wind position accuracy (1 range cell) | depends on choice of algorithm; $= (\lambda z)^{1/2}$ |
| Maximum range (application-dependent) | $d^2/\lambda$ |

Legend:
$t_d$ = frame duration
$t_r$ = frame rate
$z$ = mean range of range cell
*For some algorithms, d should be replaced by $d_s$ in this equation.

A secondary aspect of the input is the strength of the scintillations. Based on the field data taken, adequate scintillation strength should be available for relatively short paths (approximately 500 meters, or more), for low wind speeds (approximately 3 km/hr, or more), and under calm conditions (10 PM at night in August). For longer paths, higher wind speeds, or more turbulent conditions, the scintillation strength should only be greater; thus lack of turbulence is expected to be unimportant. A complementary issue occurs when there is too much scintillation—then the simple physical arguments for this approach break down. In this limit, maintained performance has not been experimentally verified.

The overall performance reliability also depends on the processing of the images. This processing involves the software design of the system.

Software Design

The system must identify the range of scintillation-producing turbules and then track them. To do this, one must account for the physics outlined above. The basic equation describing the physics is the Rytov equation for scintillation. Scintillation can be described in terms of the so-called log-amplitude:

$$\chi(x) = (½) \log (I(x)/Io) \quad (2)$$

where $I(x)$ is the local intensity at pixel x on the camera, and $Io$ is the mean intensity. Another formula, Eq. 3, relates the Fourier components of the log-amplitude, denoted by $\chi^{(k)}$, to the properties of the turbulence-induced refractive index variations, and to the diffractive properties of the impinging light:

$$\chi(k) = k_o \int dz \sin\left(\frac{k^2 z}{2k_0(1-z/L)}\right) \delta n(k',z) \quad (3)$$

where the integral is from the source at range z=L to the receiver at z=0, k is the spatial wavenumber of the scintillation at the receiver plane, $k_o$ is the mean optical wavenumber of the incident light, and $\delta n(k^1,z)$ is the Fourier component of the (random) refractive index evaluated at range z and at spatial wavenumber $$k^1 = k/(1-z/L). \quad (4)$$

This Fourier component depends on the local wind $v(z)$ and the time t as well:

$$\delta n(k',z) = \sqrt{\Phi(k',z)}\ G(k',z)\exp(ik' \cdot v(z)t) \quad (5)$$

where $v(z)$ is the wind profile to be estimated, $\Phi(k^1,z)$ is the power spectrum of the turbulence-induced refractive index fluctuations, and $G(k^1,z)$ is a random complex gaussian variate with zero mean and unit variance that is approximately delta correlated in k and z. The power spectrum of the turbulence is assumed to be Kolmogorov or von Karman; this assumption is standard, but is nonessential. Simulation and experiment performed indicate that the exact form of the turbulence power spectrum is not critical for this application, so long as the spectrum decays and exhibits an inner scale behavior as the spatial frequency is increased. The von Karman spectrum used is $$\Phi(k,z) = 0.033 C_n^2(z)(k_{ot}^2 + k^2)^{-11/6} \exp(-(k/k_{in})^2) \quad (6)$$

where $C_n^2(z)$ is the refractive index (density) structure function, $k_{ot}$ is the spatial wavenumber corresponding to the outer scale, and $k_{in}$ is the spatial wavenumber corresponding to the inner scale.

With this preface, the analysis becomes more obvious. The goal is to estimate the velocities $v(z_j)$ at positions $z_j$ along the path estimate, and, at least indirectly, the $G(k,z_j)$ which determines the strength of the scintillation. To do this, one measures $x(k,t=0)$ and wishes to solve for $G(k^1,z_j)$; at the subsequent time steps one measures $x(k,t=n\Delta t)$, for at least n=1, and then solves for $v(z_j)$. Mathematically, $$\chi(k,t=0) = \sum_{j=1}^{N_z} \Psi(k,z_j) C(k',z_j) \quad (7)$$

$$\Psi(k,z_j) = \int_{z_j-\Delta z_j}^{z_j+\Delta z_j} dz \sin\left(\frac{k^2 z}{2k_0(1-z/L)}\right)(k_{ot}^2 + \quad (8)$$

$$C(k',z_j) = [0.033\ C_n^2(z_j)]^{1/2}\ k_o\ G(k',z_j) \quad k^2)^{-11/12}\exp(-1/2\ (k'/k_{in})^2) \quad (9)$$

$$\chi(k_x,n\Delta t) = \sum_{j=1}^{N_z} \Psi(k,z_j) C(k',z_j) \exp(ik'\ v_x(z_j)n\Delta t) \quad (10)$$

where one now solves for the $C(k^1,z_j)$ and the $v(z_j)$ with the $x(k)$'s and the $\Psi(k,z_j)$'s assumed known. Note in equation (8) that the velocity fluctuations within a range cell are ignored. Equations (7)–(9) are well-known to those skilled in the art of turbulence measurement and theory. However it is not generally appreciated that the $\Psi(k,z_j)$ factors are strongly peaked functions of k for fixed $z_j$. This permits a first case in which the above equations may be solved. In this case these functions may be approximated as delta functions.

$$\Psi(k=k_x,z_j) \approx \Psi_o \delta(k_x - k(z_j)), \quad (11)$$

$$\Psi(k=k_y,z_j) \approx \Psi_o \delta(k_y - k(z_j)). \quad (12)$$

Here $\delta(x-y) = 1$ if x=y, and equals zero otherwise. The functional form of $k(z_j)$ has been determined to be approximated by $$k(z_j) = 1/(z_j/k_o(1-z_j/L))^{1/2} \quad (13)$$

In the case of strongly peaked response, Eqs. (7) and (10) become $$\chi(k_x,t=0) = \Psi_o C(k_x^1(z_j),z_j) \quad (14)$$

$$\chi(k_x,n\Delta t) = \Psi_o C(k_x^1(z_j),z_j) \exp(ik_x^1(z_j)v_x(z_j)n\Delta t) \quad (15)$$

and similar equations hold for $k_y$. From these equations, one may easily determine the velocities $v_{x,y}(z_j)$. A robust means of doing this is to form the expression $$\exp(ik_x'(z_j)v_x(z_j)n\Delta t) = \frac{\chi(k_x,n\Delta t)\chi^*(k_x,t=0)}{|\chi(k_x,t=0)|^2} \quad (16)$$

From (16) one may easily deduce the x-component of the velocity if $n\Delta t$ is sufficiently small so that $2\pi$ ambiguities are avoided. A yet more robust version of (16) may also be written, in which averaging is performed over multiple frames to improve the signal:

$$\exp(ik_x'(z_j)v_x(z_j)\Delta t) = \sum_{n=1}^{N} \frac{\chi(k_x,n\Delta t)\chi^*(k_x,(n-1)\Delta t)}{|\chi(k_x,(n-1)\Delta t)|^2} \quad (17)$$

and a similar equation may be used to obtain the y-component of the velocities. Eq.(17) is the algorithm currently used for real-time processing; however it may be improved with another approach based on statistical averaging, as will be discussed below.

One may observe from Eq.(6) that only $N_k$ measurements are made from the first frame one for each k. However there are $(N_k+2)N_z$ unknown $C(k,z_j)$, $v_x(z_j)$, $v_y(z_j)$. Hence the system of equations is highly under-determined, upon first inspection. Thus, in general, one must obtain sufficient additional equations and then go through a tomographic reconstruction process. Unfortunately for this second approach, the required number of frames would then be at least $N_z$, and for $N_z=10$ range cells one would require at least 10 image frames. This large number of frames would have to be taken in a brief interval in which the turbulence remains between the source and the receiver. For moderate wind levels (approximately 10 m/sec), this implies measurement rates of about 10 KHz. This is achievable with contemporary low resolution solid-state cameras, but the issue of sufficient signal in the short frame duration is nonetheless challenging. Thus second signal processing approach is not utilized here, although an algorithm of the existing software has been designed to treat this implemented this approach.

A third algorithm improves the first algorithm (17) with a statistical approach that involves averaging over time. Though the $C(k,z_j)$'s may not be known a priori, their statistical properties are known and more easily measured. The average is known to be zero, and their variance is $\text{Var}(C(k,z_j))=[0.033C_n^2(z_j)]k_o^2$. Since the variance is non-zero, averaging data corresponding to pairs of $\chi(k)$'s will produce non-zero results and the number of unknowns is reduced because $\text{Var}(C(k,z_j)) \equiv VC(z_j)$ is independent of k. The averaged data will have only $3N_z$ unknowns: $VC(z_j)$, $v_x(z_j)$ and $v_y(z_j)$, which can be solved out. Since the unknowns are a function of z only, the equations have far fewer unknowns than does the tomographic approach and are more easily solved. This approach has been implemented in the third algorithm of the current software package, using time averages of the form $<\chi(k,t)\chi^*(k,t+\Delta t)>$. This approach requires a reduced number of unknowns and may be accomplished using modern, fast-readout CCD cameras.

As more frames of data are taken the SNR of the measurement improves and greater accuracy is obtained. However, the allowable time duration is no longer set by the wind transit time, but instead by the wind stability time. Thus the allowable duration of data collection is on the order of seconds, and not milliseconds. This eased constraint allows improved signal and easier data acquisition, and for this reason this approach is preferred.

In addition to the described hardware and processing, several well-known enhancements are available. For example, the resolution and accuracy of the system could be significantly enhanced using tomographic techniques and other variations. As is well-known, by utilizing multiple source points at differing ranges and cross-ranges, one can more accurately position the location of a scintillation-producing turbulence layer. To perform these types of measurements, only minor modifications are required of the hardware, and the formalism of the processing already allows for these possibilities. For example, a third measurement using a slight transverse displacement of a source will shift the scintillations in proportion to their distance from the receiver, thus providing an accurate means of locating the relevant turbules. The means of performing this displacement would entail a small but rapid repositioning of the pinhole field-of-view filter, which could be accomplished using piezoelectric actuators. Thus this embodiment offers significant growth potential in performance with only a small increase in cost and complexity.

For the third approach involving statistical averaging, one optimizes the following processing functional with respect to wind variations:

$$F(\{VC(z_n),v(z_n)\})=<\Sigma_{k,j1,j2}|\chi_{j1}(k,t_{j1})\chi_{j2}^*(k,t_{j2})-\chi_{Tj1}(k,t_{j1})\chi_{Tj2}^*(k,t_{j2})|^2> \quad (18)$$

Where $\chi_{j1,2}$ are measured log-amplitude components at times j1 and j2 respectively, and the subscript T refers to true values that are fit to the measurements.

This functional employs the products of log amplitude components. Use of this functional allows meaningful evaluation of the expectation over the ensemble of turbulence, these products therefore have an intuitive explanation for wind estimation and permit simple approximations to be used.

To take the ensemble average, assume the power-spectrum is known (Kolmogorov or Van Karman). The ensemble average is then:

$$\Sigma_{k,j1,j2}|\chi_{j1}(k,t_{j1})\chi_{j2}^*(k,t_{j2})|^2+<|\chi_{Tj1}(k,t_{j1})\chi_{Tj2}^*(k,t_{j2})|^2> \quad (19)$$

$$-\chi_{j1}(k,t_{j1})\chi_{j2}^*(k,t_{j2})<\chi_{Tj1}(k,t_{j1})\chi_{Tj2}^*(k,t_{j2})>-\text{c.c.} \quad (20)$$

Then differentiate the functional with respect to the $2N_z$ unknowns $V_n$ and the $N_z$ unknowns $VC(z_n)$ to get an equal number of equations. For example.

$$\partial F/\partial v_{nx}=0=\Sigma_{k,j1,j2}\chi_{j1}(k,t_{j1})\chi_{j2}^*(k,t_{j2})G_x(k,z_n,j_1,j_2)\exp(ik\cdot v_n\Delta t)+c(21)$$

where $$G_x(k,z_n,j_1,j_2)=ik_x\Delta t\Delta z_n\Phi(k,z_n)\sin(k^2z_n(1-z_n/L_{j1})/2k_o)\sin(k^2z_n(1-z_n/L_{j2})/2k_o)\exp(ik\cdot\Delta w) \quad (22)$$

and where $\Phi(k^1,z)$ is given by Eq.(6).

$\Delta t$ and $\Delta w$ are defined to simplify notation, they at equal to $$\Delta t=t_{j1}(1-z_n/L_{j1})-t_{j2}(1-z_n/L_{j2}) \quad (23)$$

$$\Delta w=w_{j1}(z_n/L_{j1})-w_{j2}(z_n/L_{j2}) \quad (24)$$

where $L_{j\Delta,2}$ are equal to the range of the source at times $t_{j1}$ and $t_{j2}$, respectively.

There is a similar equation for $G_y$ for the y-component of the wind velocity.

Thus $v_x(z_n)$, $v_y(z_n)$ can be solved by setting the phase of the above equations equal to zero.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A wind profilometer for determining the wind velocity transverse to the line of sight to a luminous region comprising, a camera having a pupil plane for obtaining a set of light intensity data at the pupil plane from the luminous region, obtaining a first set of light intensity data from the luminous region at a first time, obtaining a second set of light intensity data from the luminous region at a second time, a means for relaying the light intensity data from the camera to a microprocessor, a means for analyzing the light intensity data to analyze the intensity variations corresponding to scintillations of the light in the medium caused by schlieren and determining the range of the schlieren, a means for comparing the first and second sets of light intensity data and computing the wind velocity between the camera and the luminous region by comparing the positions of the schlieren at different times.

2. A wind profilometer as in claim 1 wherein, there is a means for the light intensity data to be converted to digitized electronic data, and means for Fourier filtering and averaging of the digitized electronic data to extract the position of schlieren.

3. A wind profilometer as in claim 1 wherein, there is a means for spectrally filtering the light from the luminous region before it enters the camera.

4. A wind profilometer as in claim 1 wherein, there is a means for filtering the field-of-view of light from the luminous region before it enters the camera.

5. A wind profilometer as in claim 1 wherein, a means for gathering additional sets of light intensity data from the luminous region at a plurality of additional times and from a different position and a means for tomographically processing the light intensity data from the luminous region to determine the wind velocity.

6. A wind profilometer as in claim 1 wherein, the wind profile is determined by means for statistical averaging of a plurality of pairs of sets of light intensity data.

7. A wind profilometer as in claim 1 wherein, the luminous region has an illumination means reflecting light from an object to enhance the light received at the camera.

8. A wind profilometer as in claim 1 wherein, there is an illumination means for backscattering light from the atmosphere to enhance the light received at the camera.

9. A wind profilometer as in claim 1 wherein, substantially all of the light entering the pupil aperture from the luminous region is utilized to increase the signal-to noise ratio and thereby increase the accuracy of the estimate of the wind profile.

* * * * *